United States Patent [19]

Bu-Abbud

[11] Patent Number: 5,067,810
[45] Date of Patent: Nov. 26, 1991

[54] SHARED LASER TANDEM OPTICAL TIME DOMAIN REFLECTOMETER

[75] Inventor: George Bu-Abbud, Plano, Tex.

[73] Assignee: Reliance Comm/Tec Corporation, Chicago, Ill.

[21] Appl. No.: 541,577

[22] Filed: Jun. 21, 1990

[51] Int. Cl.[5] .............................................. G01N 21/88
[52] U.S. Cl. .................................................. 356/73.1
[58] Field of Search ....................................... 356/73.1

[56] References Cited

U.S. PATENT DOCUMENTS 4,875,772 10/1989 Gentile ............................... 356/73.1

FOREIGN PATENT DOCUMENTS 1322093 7/1987 U.S.S.R. .............................. 356/73.1

*Primary Examiner*—Vincent P. McGraw
*Attorney, Agent, or Firm*—Michael M. Rickin

[57] ABSTRACT

An instrument such as an optical time domain reflectometer (OTDR) in which a single source of light such as a laser shares N (N≧2) optical fibers. The pulse of light from the laser is split into N pulses each having essentially the same power. The N pulses are input to an associated one of the N fibers. The instrument has N detectors each associated with one of the fibers. Two or more of the instruments in which each single laser shares two fibers can be connected in tandem with one or more optical fibers. The light pulses from each of the instrument's single lasers are split into two pulses each having essentially the same power. The light pulses from each of the instruments which propagate in opposite directions on the same fiber are synchronized to each other so that a light pulse from one of the instruments which propagates in one direction on that fiber does not interfere with the light pulse from another of the instruments which propagates in the opposite direction on that same fiber and also does not interfere with the backscatter from that another light pulse on that same fiber.

32 Claims, 7 Drawing Sheets

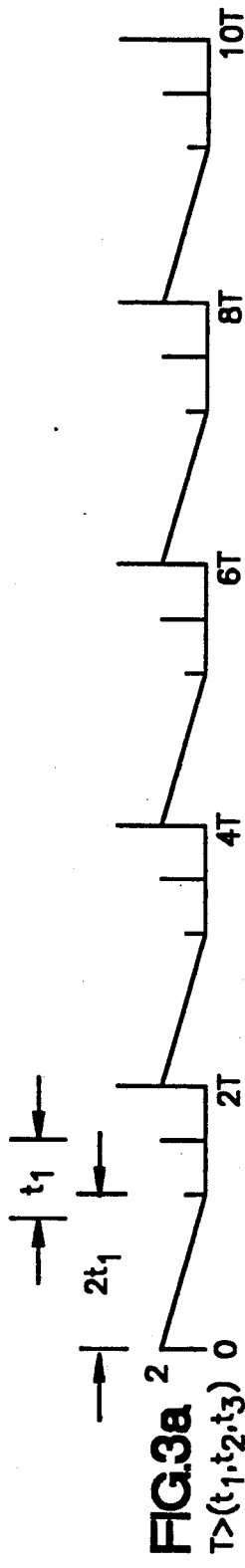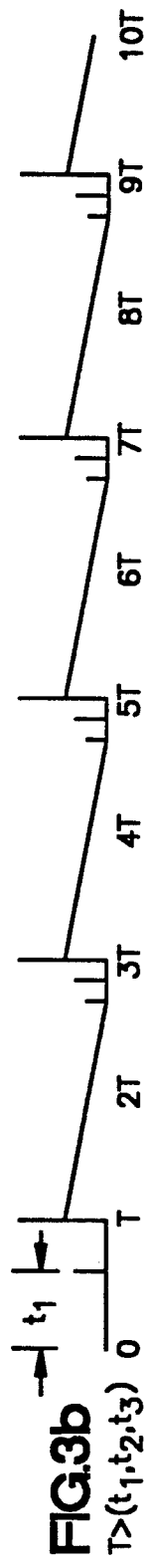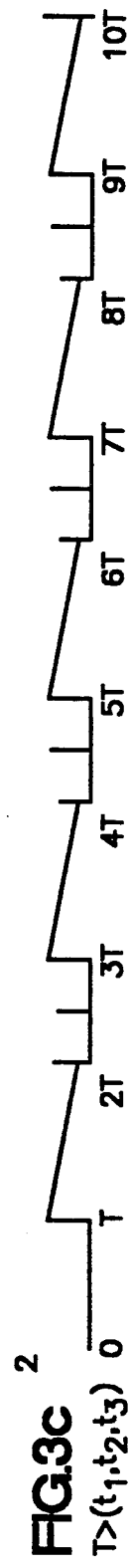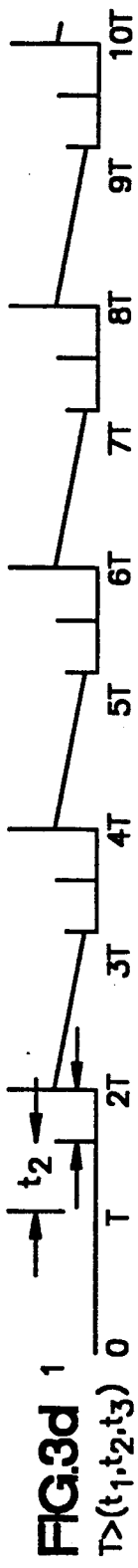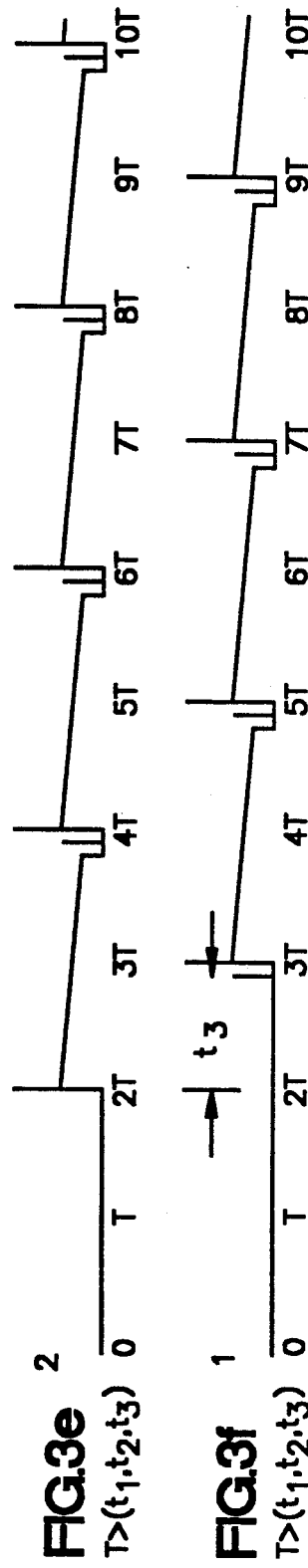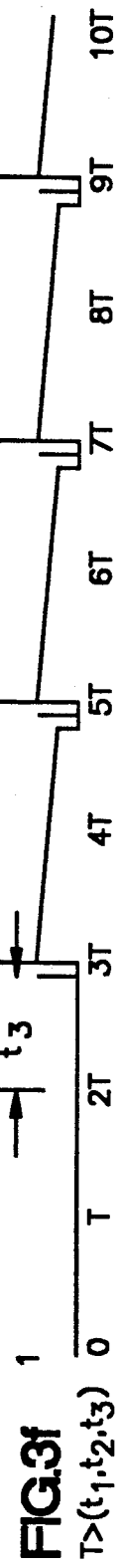

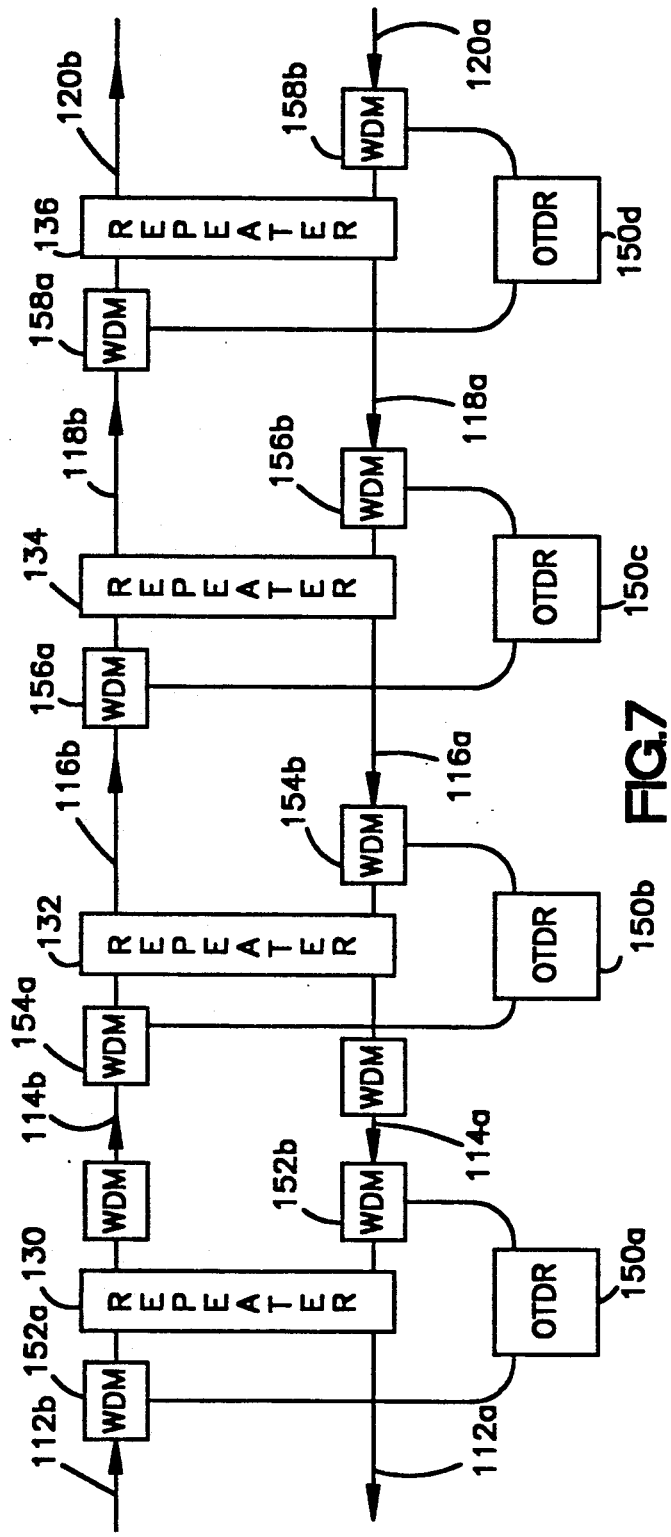
FIG.7
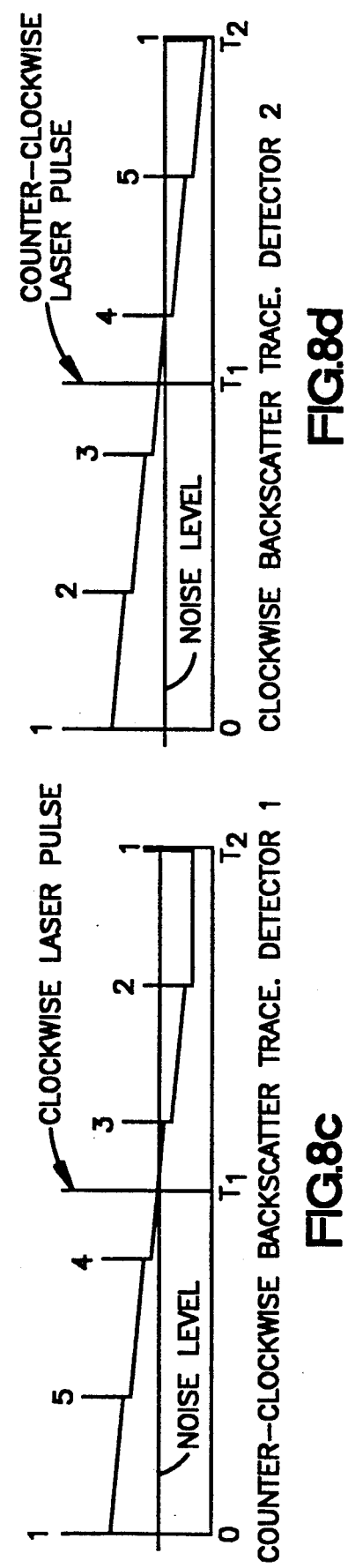
FIG.8d
FIG.8c

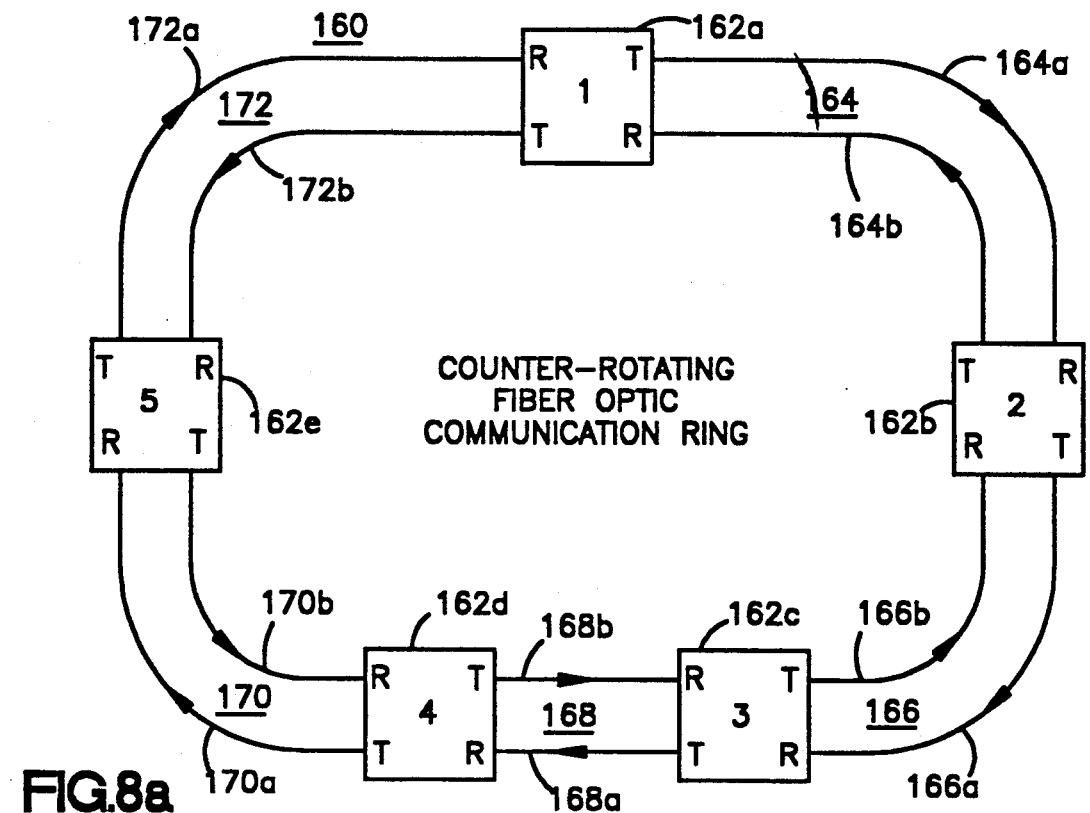
FIG.8a  COUNTER-ROTATING FIBER OPTIC COMMUNICATION RING
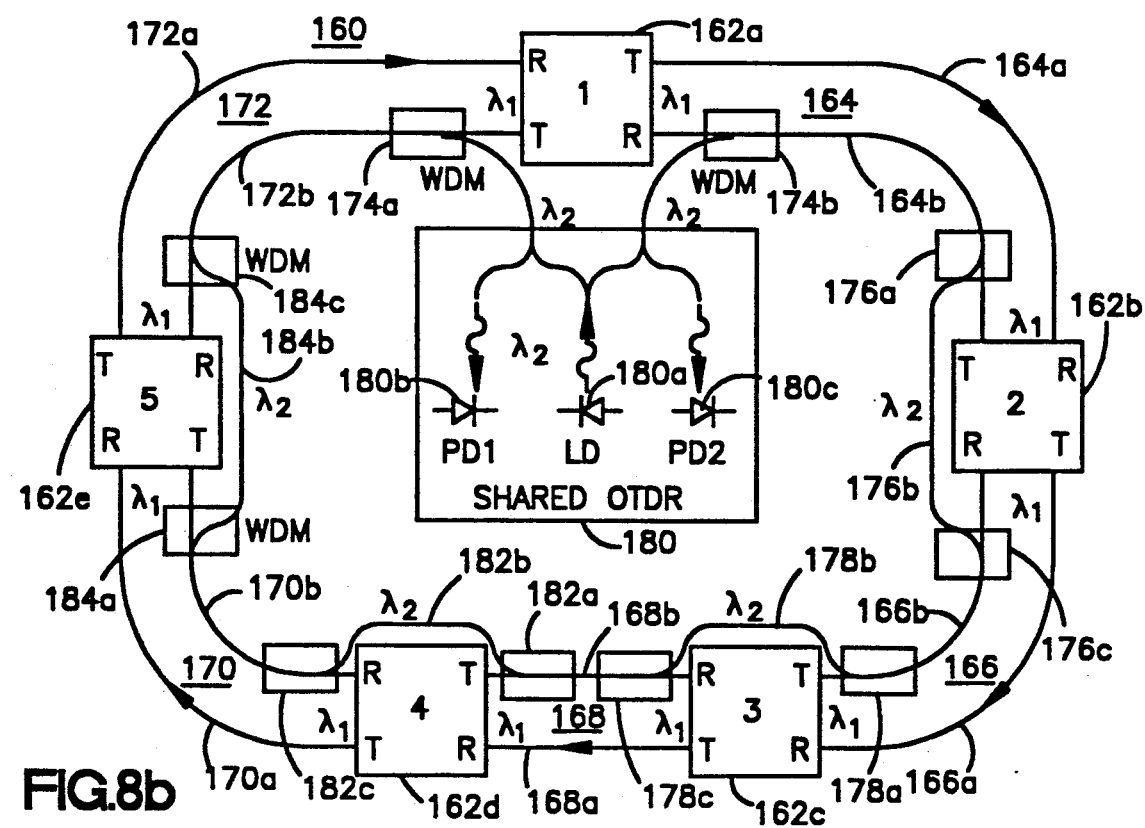
FIG.8b  SHARED OTDR MONITORING LIVE FIBER OPTIC RING

SHARED LASER TANDEM OPTICAL TIME DOMAIN REFLECTOMETER

BACKGROUND OF THE INVENTION

1. Field of the Invention

This invention relates to lasers and more particularly, to the use of lasers in optical time domain reflectometers (OTDRs).

2. Description of the Prior Art

The telecommunications industry is making increasing use of optical fiber to provide both subscriber and long distance services. Several companies have installed optical fiber networks to provide service between a number of cities located in different states. The rates at which information is transmitted on such networks has steadily increased as has the use of such networks. A disruption in service caused by a break in the fiber, whether accidental or intentional, can then have substantial adverse economic consequences not only for the company providing the service but also for the users of the service. Therefore, it is desirable that the service providing company be able to quickly and easily locate the site of the break so that the same can be repaired.

The service providers have been using OTDRs in order to locate the site of the break. In my U.S. patent application Ser. No. 07/264,356, which was filed on Oct. 31, 1988 and is assigned to the same assignee as is the present invention (hereinafter "the '356 application"), now U.S. Pat. No. 4,958,926 which issued on Sept. 25, 1990, there is described an OTDR which can be permanently connected to an optical fiber. The OTDR of the '356 application includes closed loop circuitry which allows the OTDR to continuously monitor the light backscattered from the fiber to which it is connected in response to a pulse of light from the laser of the OTDR. When there is a break in that fiber, the OTDR display is used to determine the location of the place at which the break has occurred.

The length of optical fiber span, i.e. distance D in Km, that can be monitored by the OTDR of the '356 application can be calculated as follows:

$$D = DR/2a \quad (1)$$

where DR is the dynamic range, i.e. how far the OTDR can see and $a$ is the fiber loss coefficient in dB/Km. For an optical fiber having a 10 micrometer core and a 125 micrometer cladding the loss coefficient is about 0.25 dB/Km.

The dynamic range can be calculated as follows:

$$DR = Ps - 2Lc - 2Ls + P_B - P_R - \text{Margin} \quad (2)$$

where Ps is the power of the laser source in dBm, Lc is the splitting loss of the coupler by which the laser of the OTDR is connected to the fiber, Ls is the excess loss (coupler, connector, etc.), $P_B$ is the backscatter ratio in dB, $P_R$ is the OTDR receiver noise equivalent power including the averaging and processing improvement in dBm and Margin is a predetermined design safety factor.

For example, in an OTDR of the type described in the '356 application wherein the laser diode operates at a wavelength of 1550 nanometers and provides a pulse of light having a width of one microsecond and the OTDR has the following parameters:

Ps = 10 dBm
Lc = 3 dB
$P_B$ = −53 dB
$P_R$ = −95 dBm (a receiver with a one microsecond time resolution, a noise equivalent power of −70 dBm and a processing improvement of 25 dB);
DR = 41 dB. With a loss coefficient of 0.25 dB/Km for the optical fiber, the distance as calculated from equation (1) is:
D = 82 Km (about 51 miles).

In applications where long repeatered spans of transmission optical fiber are to be monitored, it is advantageous to increase the length of fiber being monitored by each OTDR. As can be seen from equation (1) the distance that the OTDR can monitor is directly proportional to the dynamic range. In the OTDR of the above example, in order to double the distance the dynamic range would also have to be doubled, i.e. the dynamic range would have to be increased to 82 dB.

For a doubling of the dynamic range and the same receiver sensitivity (this assumes that the receiver sensitivity has already been maximized), it can then be determined from equation (2) that Ps would have to be increased to 51 dBm, i.e. an increase of 41 dBm. That is over a 12,000 fold increase in laser power. In other words, the power would have to be increased from the 10 milliwatts used in the laser of the OTDR of the '356 application to more than 120 watts. Such a laser is not commercially available today. In addition, at such power levels the response of the optical fiber of the type described above becomes nonlinear and it is not possible to monitor the fiber using the backscattered light.

Even a smaller increase in dynamic range may still require a substantial increase in laser power, as for every 5 dB increase in dynamic range the laser power must be increased by a factor of 10. For example, an increase in dynamic range by 15 dB would require a 1,000 fold increase in laser power from 10 milliwatts to 10 watts. Therefore, it is clear that substantial increases in laser power are needed to obtain even relatively modest increases in distance.

In a manner similar to the above examples, it can be shown that a doubling of the laser power for the same receiver sensitivity would only increase the distance by a very small amount. The reverse is also true. It can also be shown that decreasing the laser power by half for the same sensitivity would only diminish the distance by a small amount.

The object of the present invention is to nearly double the distance of optical fiber that can be monitored with the same laser power and the same receiver sensitivity that is used by a conventional OTDR, one example of which is disclosed in the '356 application. It is also an object of the present invention to nearly double the distance that can be monitored with the same laser power even if the distance is also increased by increasing the receiver sensitivity.

SUMMARY OF THE INVENTION

An instrument for sharing N (N≧2) optical fibers. The instrument has a single source for generating a pulse of light. The single source pulse of light is split into N pulses each of which have essentially the same power. Each of the N pulses are associated with one of the N fibers. The instrument also has a circuit which responds to light from each of the N for monitoring each of the N fibers independently of any other of the N fibers fibers when each of the N light pulses are input to the associated one of the N fibers.

A system which has a first instrument for sharing first and second fibers. The first instrument has a single source for generating a pulse of light. The single source pulse of light is split into two pulses each of which have essentially the same power. Each of the two pulses are associated with one of the first and second fibers. The first instrument also has a circuit which responds to light from at least the second fiber when the associated one of the two light pulses is input to the second fiber for monitoring at least the second fiber independently of the first fiber.

A system which has N instruments where $N \geq 2$. One of the N instruments is located at one end of the system and another of the N instruments is located at the other end of the system. Each of the N instruments other than the instruments located at the system ends are located between the system ends. The system has $N-1$ fibers. One of the fibers is connected to the instrument located at the one system end and the instrument which is next adjacent the one system end and in a direction towards the other system end. Another one of the fibers is connected to the instrument located at the other system end and the one of the N instruments next adjacent the other system end in a direction towards the one system end. Each of the $N-1$ fibers other than the fibers connected to the system ends located instruments are connected between one of the other than N instruments and that one of the other than N instruments next adjacent.

In this system each of the N instruments has a single source for generating a pulse of light. The single source pulse of light is split into two pulses of light each of which have essentially the same power. Each of the two pulses of light are associated with one of the $N-1$ fibers connected to the instrument. Each of the N instruments also has a circuit which responds to the light backscattered from each of the associated one of the $N-1$ fibers for monitoring each of the associated one of the $N-1$ fibers independently of each other; when the two pulses are input to the associated one of the $N-1$ fibers. Each of the N instruments also further has circuitry for causing the source to generate the single pulse at times which are separated by 2T where T is the time it takes for a pulse of light to propagate from one end to the other end of the longest one of the $N-1$ fibers. The single pulses of light are generated in a manner such that a pulse of light from any one of the N instruments propagating in one direction on the associated one of the $N-1$ fibers does not interfere with a pulse of light from an adjacent one of the N instruments propagating in the opposite direction on the associated one of the $N-1$ fibers.

DESCRIPTION OF THE DRAWING

FIG. 1b shows a simplified block diagram of a closed loop control system for use in the OTDRs of FIGS. 1 and 1a.

FIGS. 3a to 3f show waveforms of light amplitude versus time for the light received at the detectors of the tandem OTDRs of FIG. 2.

FIG. 7 shows a simplified diagram wherein a number of OTDRs are connected to share live fibers.

FIG. 8a shows a simplified diagram for a counter-rotating fiber-optic communications ring.

FIG. 8b shows a simplified diagram wherein a single OTDR monitors the ring of FIG. 8a by sharing the live fibers of the ring.

FIGS. 8c and 8d show the waveform for the light backscattered on the live fibers of the ring as a result of pulses from the shared OTDR propogating counter-clockwise and clockwise respectively on the ring fibers.

DESCRIPTION OF THE PREFERRED EMBODIMENTS

Figure 1:
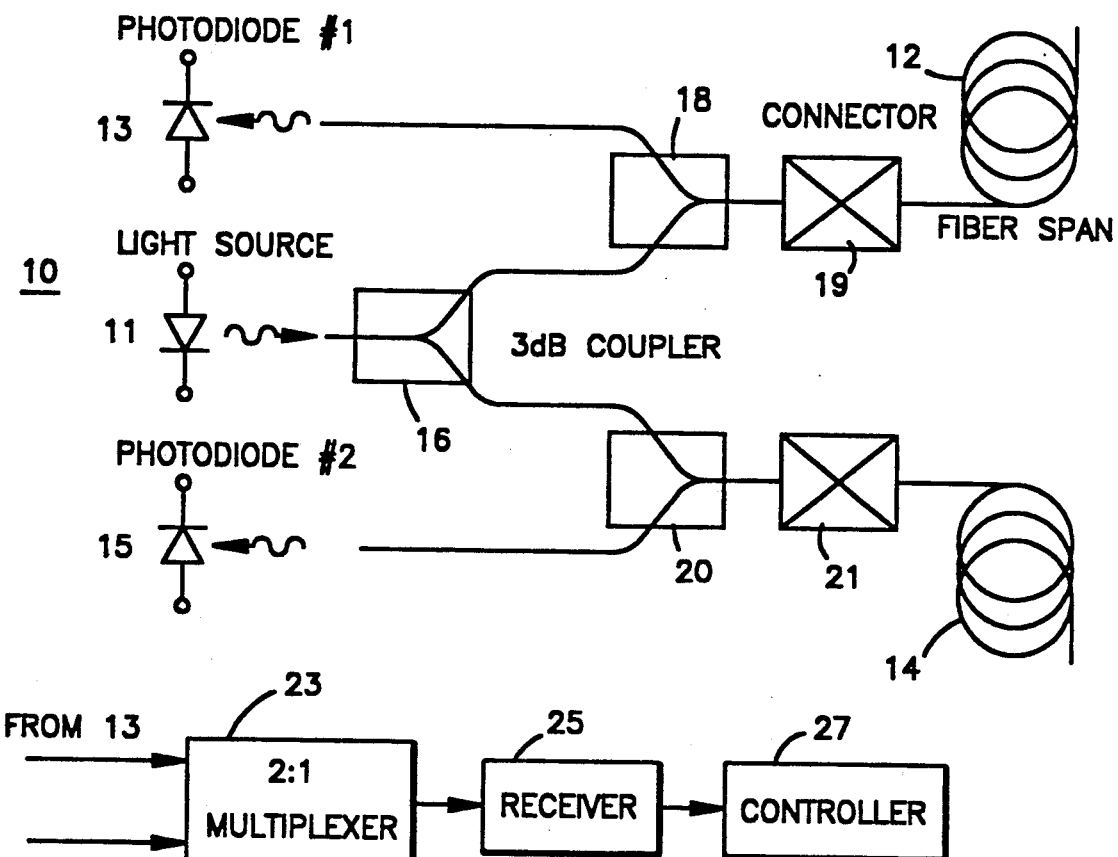
FIG. 1 shows a simplified diagram of an OTDR having its laser shared by two fibers to be monitored.

Referring now to FIG. 1, there is shown a simplified diagram of a single OTDR 10 having its laser connected to first and second optical fibers 12, 14 that are to be monitored. OTDR 10 includes laser diode 11 which has an output power Ps. The output light of diode 11 is connected by three dB splitter 16, a coupler 18 (which is also a three dB splitter) and a connector 19 to first optical fiber 12. The output light of diode 11 is also connected by splitter 16, a coupler 20 and a connector 21 to second optical fiber 14. The backscattered light from fiber 12 is detected by diode 13 while the backscattered light from fiber 14 is detected by diode 15.

As is shown in FIG. 1, the analog electrical signal developed by diodes 13 and 15 in response to the backscattered light on fibers 12 and 14 is connected by 2:1 multiplexer 23 to receiver 25 and controller 27. As is described in detail in the '356 application, controller 27 includes a microcomputer to control the gain of the receiver 25. Controller 27 also controls the amplitudes of the pulse and bias currents into the laser diode 11. Multiplexer 23, which may be embodied as a high isolation analog switch, allows the diodes 13 and 15 to alternately provide the input signal to controller 27. In that manner, the same OTDR 10 can individually monitor each of fibers 12 and 14.

By splitting the laser power, Ps, between the two fibers 12, 14, the laser power available to each is:

$$Ps - 3 \text{ dB}.$$

The dynamic range, $DR_1$, for optical fiber 12 can be determined from equation (2) as:

$$DR_1 = Ps - 3dB - 2(Lc_1 + Ls_1) + P_B - P_{R1} - \text{Margin} \quad (3)$$

where the subscript "1" designates fiber 12. The dynamic range, $DR_2$, for fiber 14 can also be determined from equation (2) as:

$$DR_2 = Ps - 3dB - 2(Lc_2 + Ls_2) + P_B - P_{R1} - \text{Margin} \quad (4)$$

where the subscript "2" designates fiber 14.

A comparison of equations (3) and (4) with equation (2) shows that:

$$DR_1 = DR - 3 \text{ dB}$$

$DR_2 = DR - 3 \text{ dB}$

The total dynamic range, TDR, that can now be monitored by OTDR 10 is the sum of $DR_1$ and $DR_2$ which is:

$$TDR = DR_1 + DR_2 = 2DR - 6dB. \quad (5)$$

If the dynamic range, DR, that can be monitored by OTDR 10 when connected to a single fiber is the 41 dB calculated in the earlier example for the OTDR of '356 application, then the total dynamic range which can be monitored by OTDR 10 using the same laser, laser power and receiver sensitivity as calculated from equation (5) is:

$TDR = DR_1 + DR_2 = 2(41) - 6 = 76$ dB.

Therefore, OTDR 10 has provided an improvement of 35 dB.

The distance that can be monitored by OTDR 10 can be calculated from equation (1). Assuming that the loss coefficient is the same as in the earlier example, i.e. 0.25 db/Km, then the distance is:

$D = 76/2(0.25) = 152$ Km (about 94.5 miles).

As compared to the earlier example for the OTDR of the '356 application, the OTDR 10 of the present invention has provided a 185% improvement in the distance that can be monitored. Therefore, in accordance with the present invention a single OTDR 10 with the same laser, laser power and receiver sensitivity as was used in the earlier example for the OTDR of the '356 application can monitor in two different fibers almost double the distance that can be monitored in a single fiber by the OTDR of the '356 application.

As described above, the dynamic range that OTDR 10 of the present invention can monitor, as compared to the dynamic range that can be monitored by the OTDR of the '356 application for the same laser power, has increased by 35 dB. As can be seen from equation (2), in order for the OTDR of the '356 application to monitor that increased range the power of its laser would have to be increased by 35 dB, i.e. it would have to be increased from 10 milliwatts to almost 32 watts. For the reasons discussed above, that is impractical. Thus, the present invention allows an OTDR to almost double the dynamic range and therefore the distance it can monitor without any need to increase the laser power from that used when the OTDR is embodied in the manner described in the '356 application.

Figure 1B:
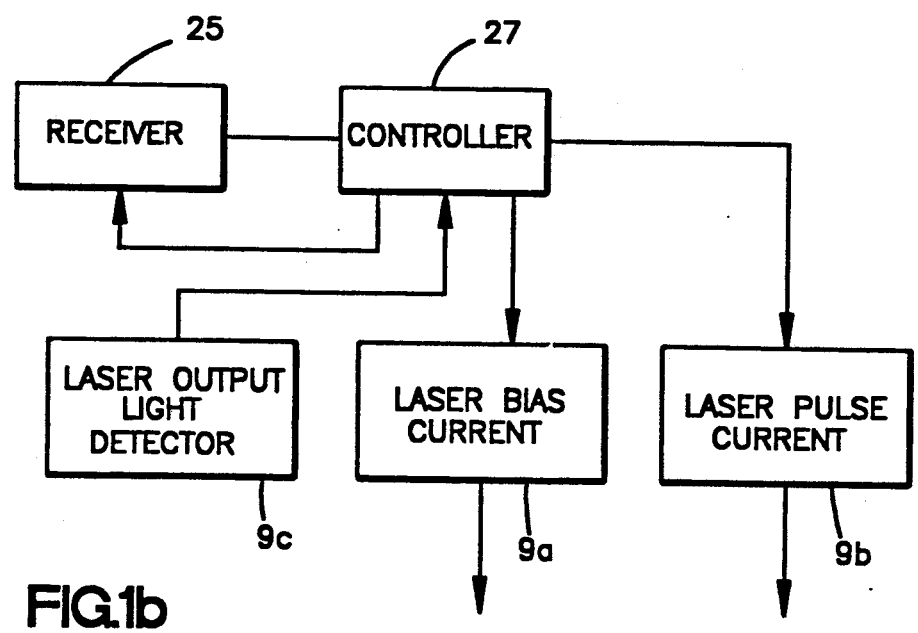
Figure 1A:
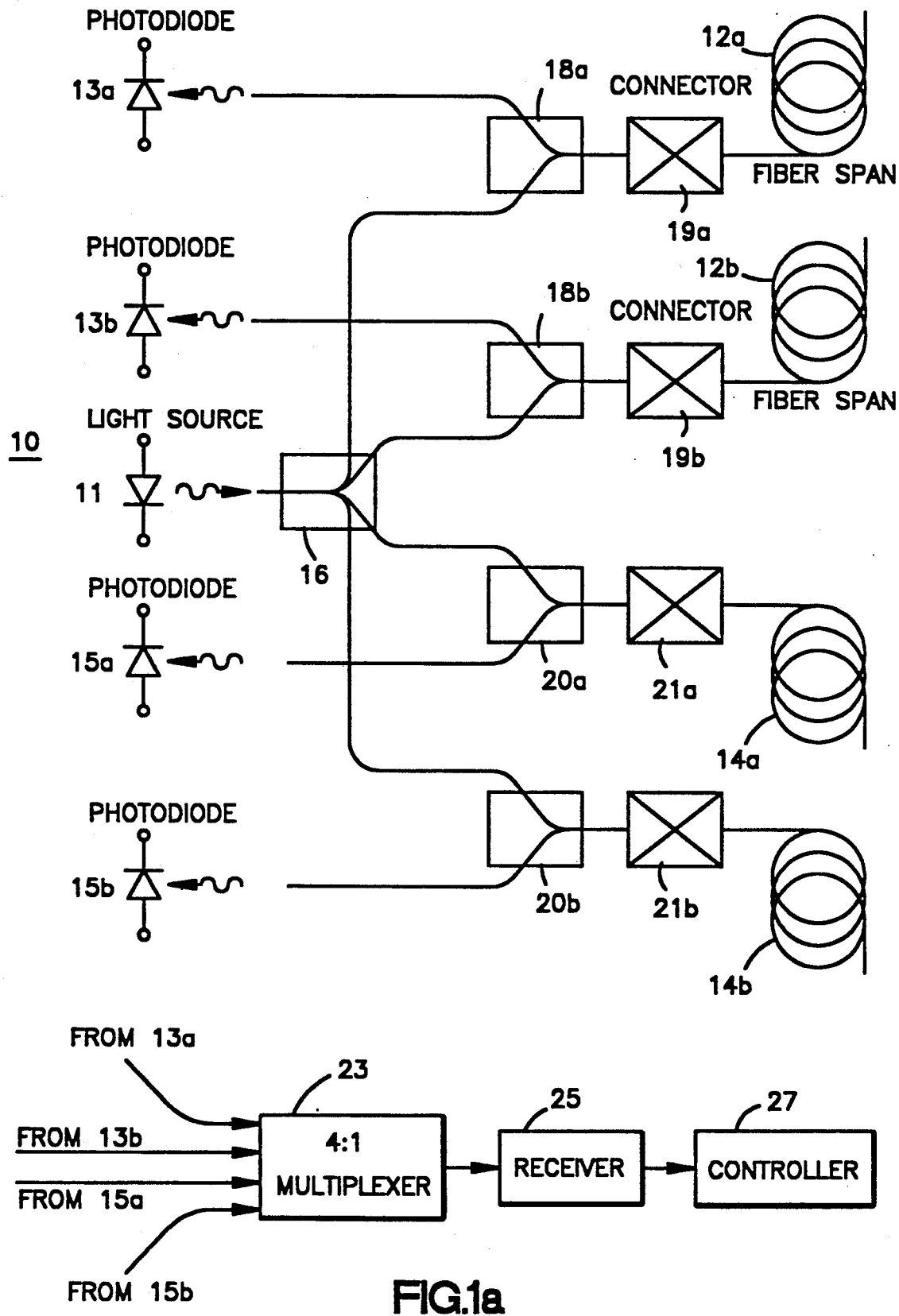
FIG. 1a shows a simplified diagram for the OTDR of FIG. 1 wherein the laser is shared by four fibers to be monitored.

Referring now to FIG. 1a, there is shown a simplified diagram of OTDR 10 having its laser diode connected to four optical fibers 12a, 12b, 14a and 14b to be monitored. The output of diode 11 is connected by four way splitter 16, coupler 18a and a connector 19a to fiber 12a; and by the splitter, coupler 18b and a connector 19b to fiber 12b. The output of the diode is also connected by splitter 16 to fiber 14a by coupler 20a and connector 21a and to fiber 14b by coupler 20b and connector 21a.

The backscattered light from fiber 12a is monitored by diode 13a, the backscattered light from fiber 12b is monitored by diode 13b, the backscattered light from fiber 14a is monitored by diode 15a and the backscattered light from fiber 14b is monitored by diode 15b. The OTDR includes a 4:1 multiplexer 23 which functions in a manner identical to that described above for the 2:1 multiplexer 23 of FIG. 1. Since the multiplexer allows the four diodes to share the same controller 27, i.e. the same microcomputer there will be a loss in processing time. Rather than a single controller 27 and receiver 25, OTDR 10 can be embodied to have a receiver and controller associated with each of the diodes 13a, 13b, 15a and 15b. In that embodiment 4:1 multi plexer 23 would not be needed. In that embodiment there would be four microcomputers one of which would be the master and the other three of which would be the slaves.

Splitter 16 of FIG. 1a splits the light output of diode 11 four ways. This four way split is accomplished by first splitting the light from diode 11 two ways. This first two way split is provided by a three dB splitter which means that the power at the output of that splitter is three dB less than the power at the input to that splitter. If the power of laser diode 11 is the same 10 dBm as in FIG. 1 then after this first split the power on each leg of the split is 7 dBm.

The light on each leg of the split is then again split two ways. This second two way split is also provided by a three dB splitter. Therefore for the 10 dBm laser power, the power at the output of splitter 16 of FIG. 1a is 4 dBm. This is 3 dB less than the power provided at the output of splitter 16 of FIG. 1. Thus for the same laser power as was used in the OTDR 10 of FIG. 1, the OTDR 10 of FIG. 1a provides 3 dB less power to each of fibers 12a, 12b, 14a and 14b then was provided to fibers 12 and 14 of FIG. 1.

From equation (2) it can be determined that for the same laser power and for the same receiver sensitivity as was used in the OTDR of FIG. 1, the OTDR 10 of FIG. 1a can monitor a dynamic range on each fiber which is three dB less than the dynamic range that can be monitored by the OTDR of FIG. 1, i.e. 35 dB. The total dynamic range that can be monitored by the OTDR of FIG. 1a is 140 dB (4×35). If it is desired that the OTDR of FIG. 1a monitor the same dynamic range of 38 dB on each of the four fibers that the OTDR of FIG. 1 monitors on each of the two fibers then, as can also be determined from equation (2), it is only necessary to increase the laser power by 3 dB or from 10 milliwatts to 20 milliwatts. This doubling of laser power does not substantially increase the cost of the laser. With this increased power the OTDR 10 of FIG. 1a can monitor a total dynamic range of 154 dB (4×38). With the same power the OTDR 10 can only monitor a dynamic range of 44 dB when connected to a single fiber.

In summary, my invention can be used in a single OTDR which shares two or more fibers, i.e. N fibers where $N \geq 2$.

As has been described above for FIG. 1, the analog electrical signal developed by diodes 13, 15 in response to the backscattered light on fibers 12 and 14 can be used to alternately provide the input signal to controller 27 so that OTDR 10 can individually monitor each of the two fibers. As has been described above for FIG. 1a, the analog electrical signal developed by diodes 13a, 13b, 15a, 15b in response to the backscattered light on fibers 12a, 12b, 14a and 14b, respectively, can be used to alternately provide the input signal to controller 27 so that OTDR 10 can individually monitor each of the four fibers. As has been further described for FIG. 1a, OTDR 10 can be embodied to have a receiver and controller associated with each of diodes 13a, 13b, 15a and 15b.

The fiber monitoring capability of OTDR 10 may be provided in any one of a number of ways. As mentioned above in connection with FIG. 1, the '356 application describes in detail one embodiment for a control system that controls both the gain of receiver 25 and the bias and pulse currents into the laser diode 11 so that the OTDR 10 can provide that monitoring capability. The manner in which the closed loop control system of the '356 application provides that control will now be briefly described in connection with the simplified block diagram of that control system shown in FIG. 1b.

As previously described, the output of detector 13 or 15 is connected to receiver 25. The multiplexer 23 shown in FIGS. 1 and 1a has been omitted from FIG. 1b as its function is not important to an understanding of the operation of the control system. Receiver 25 has amplitude limits, i.e. a predetermined operating range and an adjustable gain. The output signal from the receiver has an amplitude range which is related to the amplitude range of the electrical signal at the output of detector 13 or 15 representative of the light detected from the fiber 12 or 14 multiplied by the adjustable gain of the receiver.

The controller 27 includes means (not shown) to determine when the amplitude range of the receiver output signal is not substantially equal to the receiver operating range. The controller 27 also includes means (not shown) which may be a microcomputer to continuously control the adjustable gain of the receiver and the amplitude of the current pulse from the laser diode 11. This continuous control changes the receiver output signal amplitude range so that it is substantially equal to the predetermined operating range of the receiver. Control of the laser current pulse is obtained by controlling the output of the laser pulse current source 9b.

The closed control loop system can also be used as is described in detail in the '356 application to initially set the bias and pulse currents for the laser diode 11. That initial setting is accomplished by detecting the output light of the laser diode by laser output light detector 9c. The electrical signal at the output of detector 11c is an input to controller 27. In the initial setting mode of operation, the controller first sets the gain of receiver 25 to a minimum and the bias and pulse current amplitude to zero. The controller then controls the bias current source 9a so as to have an amplitude which is less than a threshold amplitude. The threshold amplitude is the amplitude of bias current at which the power out of laser diode 11 is no longer essentially zero. The controller then sets the pulse current amplitude so that the amplitude range of the electrical signal from detector 13 or 15 is just less than the amplitude limits of receiver 25. The controller then adjusts the adjustable gain of the receiver from the minimum so as to minimize any offset between the electrical signal amplitude range and the receiver amplitude limits.

While the present invention has been described in connection with a single OTDR which shares N ($N \geq 2$) fibers, it should be appreciated that the present invention may also be used in connection with lasers used for other purposes, e.g., a laser used to test a length or reel of optical fiber to determine its length and attenuation. In such an application, the laser diode and associated splitters, couplers and connectors would be located at the input end of the N optical fibers. The N detectors, N:1 multiplexer and the receiver would be located at the other end of the N optical fibers. The controller could be located at either end of the N fibers.

Figure 2:
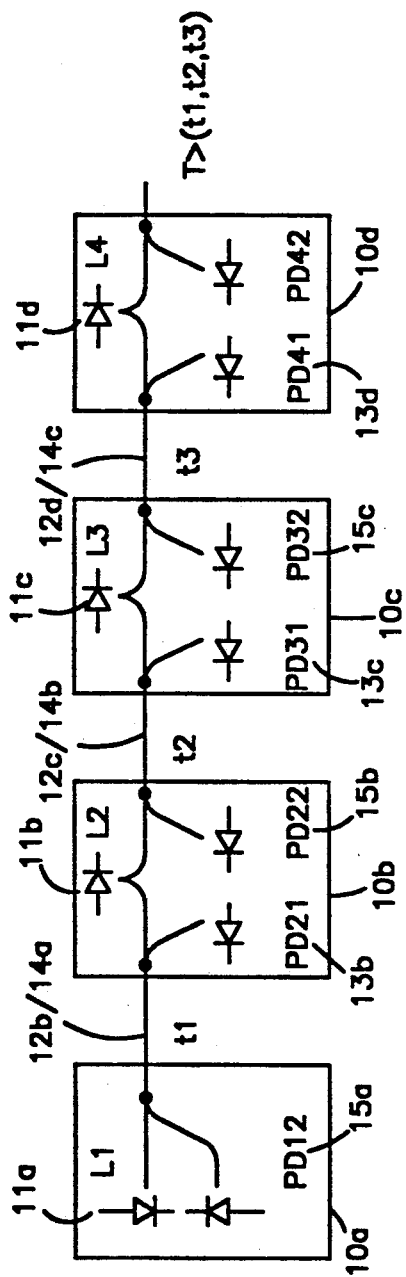
FIG. 2 shows a simplified diagram wherein four OTDRs of the type shown in FIG. 1 are connected in tandem such that each OTDR has its laser connected to two fibers to be monitored.

A further benefit of my invention can also be obtained by connecting a multiplicity of shared OTDRs 10 of the type described in FIG. 1 in tandem. One example of such a connection is shown in FIG. 2 wherein four OTDRs 10a to 10d each have an associated one of laser diodes 11a to 11d connected to an associated one of fibers 12a to 12d by an associated one of four splitters, an associated one of four couplers, and an associated one of four connectors. The associated one of laser diodes 11a to 11d are also connected to an associated one of fibers 14a to 14d by an associated one of the same four splitters used to connect the laser diodes to an associated one of fiber 12a to 12d, an associated one of four couplers, and an associated one of four connectors. As each of the OTDRs 10a to 10d is of the type described in FIG. 1, they will not be further described and the splitters, couplers and connectors need not be shown.

In FIG. 2 laser diode 11a is connected by its associated splitter, coupler and connector to fiber 12a and by the same splitter and another coupler and connector to fiber 14a. Laser diode 11b is connected by its associated splitter, coupler and connector to fiber 12b which is the same as fiber 14a. Therefore, in the tandem connection shown in FIG. 2 laser diode 11a transmits a pulse of light in one direction (from left to right in the figure) on fiber 12b/14a, while laser diode 11b transmits a pulse of light in the opposite direction (from right to left in the figure) on fiber 12b/14a.

A diode 15a detects the light backscattered on fiber 12b/14a from the pulse of light transmitted on that fiber from laser diode 11a of OTDR 10a. A diode 13b detects the light backscattered on fiber 12b/14a from the pulse of light transmitted on that fiber from laser diode 11b of OTDR 10b. Fiber 12b/14a has a length of D1 Km, i.e. the distance between OTDR 10a and OTDR 10b is D1 Km. Therefore, in the tandem arrangement of my invention, the distance D1 is monitored in the one direction by OTDR 10a and in the opposite direction by OTDR 10b.

Rather than describe for fibers 12c/14b and 12d/14c having respective distances in Km of D2 and D3, the associated OTDRs, laser diodes and detecting diodes which are used to monitor those fibers in each direction, I have provided that information in Table I below. In that table, the heading "One Direction" refers to light traveling from left to right on the associated fiber while the heading "Opposite Direction" refers to light traveling from right to left on the associated fiber. For the sake of completeness, I have also included fiber 12b/14a in the table.

TABLE I

|  | OTDR | Laser | Detector |
|---|---|---|---|
| Fiber 12b/14a |  |  |  |
| One Direction | 10a | 11a | 15a |
| Opposite Direction | 10b | 11b | 13b |
| Fiber 12c/14b |  |  |  |
| One Direction | 10b | 11b | 15b |
| Opposite Direction | 10c | 11c | 13c |
| Fiber 12d/14c |  |  |  |
| One Direction | 10c | 11c | 15c |
| Opposite Direction | 10d | 11d | 13d |

The sending of pulses of light on the fibers by the OTDRS 10a to 10d must be synchronized to each other. This ensures that the pulse of light on a fiber from an OTDR and the backscattered light resulting from that OTDR pulse is not interfered with by a pulse of light on that fiber from the adjacent OTDR and the backscattered light resulting from that adjacent OTDR pulse.

Synchronization is achieved in the following manner. One of the OTDRs at either end of the arrangement, i.e. either OTDR 10a or OTDR 10d, is selected to be the master OTDR. All of the other OTDRs are then the slaves. The distance of the longest one of the fibers 12b/14a, 12c/14b and 12d/14c is determined. The time between the pulses from the OTDR's lasers is set to be longer than twice the time it takes light to travel that longest distance. If that time between pulses is designated as 2T, then each of the slave OTDRs starting with the one closest to the master is set to generate its pulse of light at a time T from the time at which the previous OTDR has generated its pulse of light.

Applying the above synchronization scheme to the arrangement shown in FIG. 2 and selecting OTDR 10a to be the master gives rise to the following sequence which continues for as long as the OTDRs are operable:

i) laser 11a of OTDR 10a generates its pulse of light which travels from left to right on fiber 12b/14a;

ii) at the time T after OTDR 10a has generated its pulse of light, laser 11a of OTDR 10b generates its pulse of light which travels from right to left on fiber 12b/14a and from left to right on fiber 12c/14d;

iii) at the time T after OTDR 10b has generated its pulse of light (which is 2T after OTDR 10a has generated its pulse of light), laser 11c of OTDR 10c generates its pulse of light which travels from right to left on fiber 12c/14b and from left to right on fiber 12d/14c;

iv) at the time T after OTDR 10c has generated its pulse of light (which is 3T after OTDR 10a has generated its pulse of light and 2T after OTDR 10b has generated its pulse of light), laser 11d of OTDR 10d generates its pulse of light which travels from right to left on fiber 12d/14c.

The time it takes light to travel from left (right) to right (left) on fiber 12b (14a) from OTDR 10a (10b) and be detected by detector 13b (15a) is designated as t1. The time it takes light to travel from left (right) to right (left) on fiber 12c (14b) from OTDR 10b (10c) and be detected by detector 13c (15b) is designated as t2. The time it takes light to travel from left (right) to right (left) on fiber 12d (14c) from OTDR 10c (10d) and be detected by detector 13d (15c) is designated as t3.

Referring now to FIGS. 3a, 3b, 3c, 3d, 3e and 3f there is shown waveforms of light amplitude versus time for the light received at detectors 15a, 13b, 15b, 13c, 15c and 13d, respectively. In these waveforms it is presumed that fiber 12d/14c is the longest of the three fibers 12b/14a, 12c/14b and 12d/14c, and that fiber 12c/14b is the shortest of the three fibers. Therefore:

$$t3 > t1 > t2.$$

At time zero, OTDR 10a generates a pulse of light (see FIG. 3a) which is detected by detector 13b of OTDR 10b at time t1 (see FIG. 3b). As shown in FIG. 3a, during the time interval from zero to 2.t1, the detector 15a of OTDR 10a is detecting the light backscattered on fiber 12b/14a from that pulse of light. As shown in FIGS. 3b and 3c at time T, OTDR 10b generates a pulse of light which travels from right to left on fiber 14a and from left to right on fiber 12c. As described above the time T is selected to be longer than the time it takes light to travel on the longest of the three fibers. Therefore:

$$T > t3 > t1 > t2.$$

At time T +t2 the pulse of light generated by OTDR 10b at time T, which travels from left to right on fiber 12c/14b, arrives at detector 13c of OTDR 10c. The detection of that pulse by detector 13c is shown in FIG. 3d. At time T+t1 the pulse of light generated by OTDR 10b at time T, which travels from right to left on fiber 12b/14a, arrives at detector 15a of OTDR 10a. The detection of that pulse by detector 15a is shown in FIG. 3a. Since t1>t2 then T+t1>T+t2.

At time 2T, OTDR 10a again generates a pulse of light (see FIG. 3a) which travels from left to right on fiber 12b. At that same time OTDR 10c also generates a pulse of light which travels from right to left on fiber 14b (see FIG. 3d) and from left to right on fiber 12d (see FIG. 3e). As shown in FIG. 3c, during the time interval from T to T+2.t2, the detector 15b of OTDR 10b is detecting the light backscattered on fiber 12c from the pulse of light generated by OTDR 10b at time T. As shown in FIG. 3b, during the time interval from T to T+2.t1 detector 13b of OTDR 10b is detecting the light backscattered on fiber 14a from the pulse of light generated by OTDR 10b at time T.

At time 2T+t2 the pulse of light generated by OTDR 10c at time 2T, which travels from right to left on fiber 12c/14b, arrives at detector 15b of OTDR 10b. The detection of that pulse by detector 15b is shown in FIG. 3c. At time 2T+t1 the pulse of light generated by OTDR 10a at time 2T, which travels from left to right on fiber 12b/14a, arrives at detector 13b of OTDR 10b. The detection of that pulse by detector 13b is shown in FIG. 3b. At time 2T+t3 the pulse of light generated by OTDR 10c at time 2T, which travels from left to right on fiber 12d/14c, arrives at detector 13d of OTDR 10d. The detection of that pulse by detector 13d is shown in FIG. 3f.

At time T3, OTDR 10b again generates a pulse of light (see FIGS. 3b and 3c) which travels from right to left on fiber 14a and from left to right on fiber 12c. At that same time OTDR 10d also generates a pulse of light (see FIG. 3f) which travels from right to left on fiber 12d.

As shown in FIG. 3d, during the time interval from 2T to 2T+2.t2 detector 13c of OTDR 10c is detecting the light backscattered on fiber 14b from the pulse of light generated by OTDR 10c at time 2T. As shown in FIG. 3a, during the time interval from 2T to 2T+2·t1 detector 15a of OTDR 10a is detecting the light backscattered on fiber 12b from the pulse of light generated by OTDR 10a at time 2T. As shown in FIG. 3e, during the time interval from 2T to 2T+2.t3 detector 15c of OTDR 10c is detecting the light backscattered on fiber 12d from the pulse of light generated by OTDR 10c at time 2T.

At time 3T+t2 the pulse of light generated by OTDR 10b at time 3T, which travels from left to right on fiber 12c/14b, arrives at detector 13c of OTDR 10c. The detection of that pulse by detector 13c is shown in FIG. 3d. At time 3T+t1 the pulse of light generated by OTDR 10b at time 3T, which travels from right to left on fiber 12b/14a, arrives at detector 15a of OTDR 10a. The detection of that pulse by detector 15a is shown in FIG. 3a. At time 3T+t3 the pulse of light generated by OTDR 10d at time 3T, which travels from right to left on fiber 12d/14c, arrives at detector 15c of OTDR 10c. The detection of that pulse by detector 15c is shown in FIG. 3e.

At time 4T, OTDR 10a again generates a pulse of light (see FIG. 3a) which travels from left to right on fiber 12b. At that same time OTDR 10c again generates a pulse of light which travels from right to left on fiber 14b (see FIG. 3d) and from left to right on fiber 12d (see FIG. 3e).

As shown in FIG. 3c, during the time interval from 3T to 3T+2·t2, the detector 15b of OTDR 10b is detecting the light backscattered on fiber 12c from the pulse of light generated by OTDR 10b at time 3T. As previously described, detector 15b detected the light backscattered on fiber 12c from the pulse of light generated by OTDR 10b at time T. As shown in FIG. 3b, during the time interval from 3T to 3T+2·t1 detector 13b of OTDR 10b is detecting the light backscattered on fiber 14a from the pulse of light generated by OTDR 10b at time 3T. As previously described, detector 13b detected the light backscattered on fiber 14a from the pulse of light generated by OTDR 10b at time T. As shown in FIG. 3f, during the time interval from 3T to 3T+2·t3, the detector 13d of OTDR 10d is detecting the light backscattered on fiber 14c from the pulse of light generated by OTDR 10d at time 3T. Time 3T is the first time that OTDR 10d has generated a pulse of light.

There is no need to further describe FIGS. 3a to 3f, as it should be clear that the sequence of generation of light pulses by OTDRs 10a to 10d, detection of backscattered light and the pulse of light from an adjacent OTDR by detectors 13b to 13d and 15a to 15c continues in the manner described above for as long as the OTDRs continue to operate.

The synchronization scheme that has been described above for four shared tandem OTDRs can now be summarized for an arrangement of N shared tandem OTDRs (where N>1) as follows:

i) one of the OTDRs at either end of the arrangement is selected to be the master OTDR;

ii) the length of the longest one of the fibers to which the N OTDRs is connected is determined;

iii) the time 2T between the generation of pulses by each of the lasers of the N OTDRs is set to be equal to twice the time it takes a pulse of light to travel in one direction from one end to the other end of that longest length plus an additional small amount of time to provide a safety margin to take into account possible drift;

iv) the master OTDR generates a pulse of light at time zero and at times thereafter separated by 2T, i.e. times 2T, 4T, etc.;

v) the OTDR closest to the master generates a pulse of light at time T and at times thereafter separated by 2T, i.e. times 3T, 5T etc.;

vi) the next closest OTDR generates a pulse of light at time 2T and at times thereafter separated by 2T, i.e. times 4T, 6T, etc.;

vii) the generation of light pulses continues with each of the remaining OTDRs starting with the one closest to the OTDR of vi) above generating its first pulse of light at a time T after the adjacent OTDR closer to the master has generated its first pulse of light and thereafter at times separated by 2T.

Therefore, for N shared tandem OTDRs, if the master OTDR generates its first pulse of light at time zero then the OTDR furthest from the master (the N−1 OTDR) generates its first pulse of light at time (N−1)·T and at times thereafter separated by 2T, i.e. times ((N−1)·T)+2T, ((N−1)·T)+4T, etc.

Figure 4:
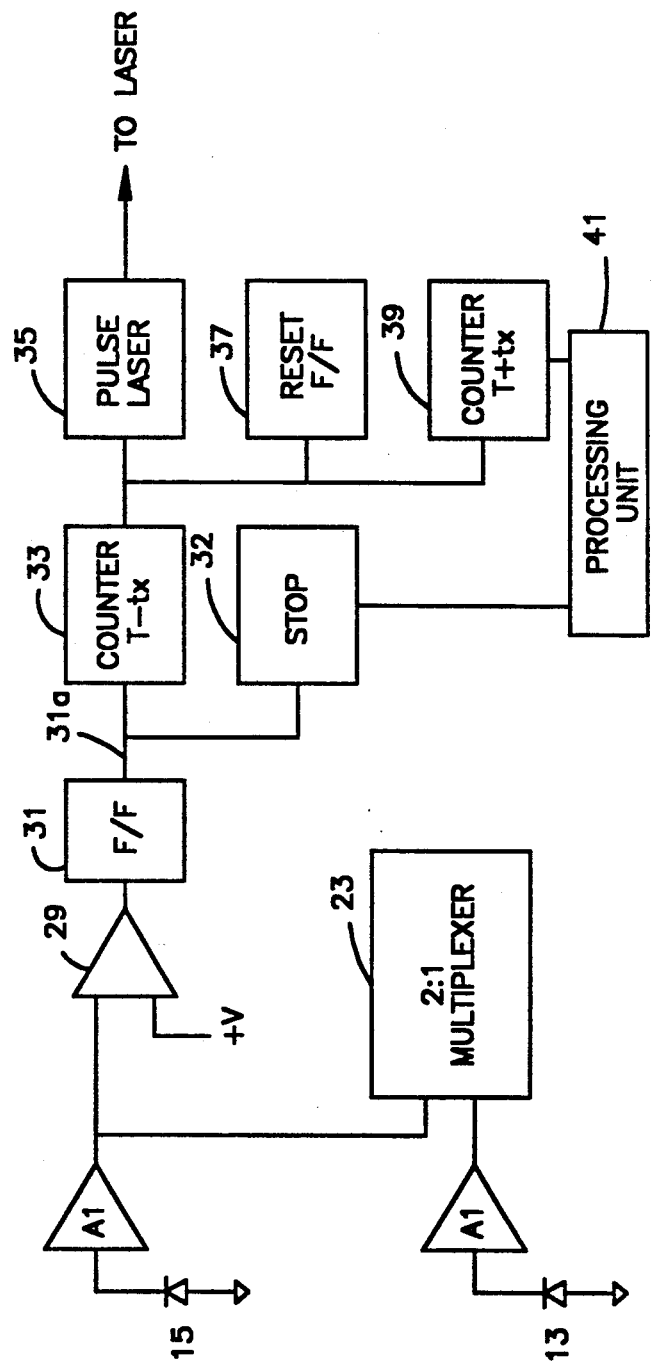
FIG. 4 shows a combination block and schematic circuit diagram for that part of each of the OTDRs of FIG. 2 which determines when the OTDR should generate a pulse of light.

Referring now to FIG. 4 there is shown a combination block and schematic circuit diagram for that part of each OTDR in an arrangement of N shared tandem OTDRs which determines the time at which each OTDR should generate a pulse of light. Each OTDR includes a detector diode 13 and a detector diode 15. A preamplifier A1 is associated with each of the detector diodes. The output of each of the preamplifiers is connected to the input of 2:1 multiplexer 23. The function of multiplexer 23 was described in connection with FIG. 1.

The output of one of the preamplifiers is also connected to a comparator 29. The particular preamplifier whose output is connected to comparator 29 depends at which end of the arrangement of the shared tandem OTDRs, the master OTDR is located. In FIG. 4 it is assumed that the master OTDR is located at the left end of the arrangement. This same assumption was made when the arrangement of FIG. 2 was described. Therefore it is detector 15 which detects the light on the fiber to the left of the OTDR in which detector 15 is located.

The output of detector 15 is connected by preamplifier A1 to the comparator input. The output of the comparator is connected to the trigger input of a flip-flop 31. When detector 15 detects light arriving at its OTDR from the fiber to the left of that OTDR, it converts that light into an electrical signal which is amplified by preamplifier A1. Comparator 29 compares the amplitude of that amplified electrical signal to a predetermined dc reference voltage. The reference voltage is selected to have an amplitude which ensures that the comparator triggers the flip-flop 31 only when the pulse of light generated by the OTDR to the left of the OTDR in which the detector is located is received at that OTDR.

The triggering of the flip-flop which results when detector 15 detects the pulse from the OTDR to flip-flop to change their state. Output 31a is connected to the input of a counter 33 which counts the time $T-t_x$ where $t_x$ is the time it takes light to travel from the OTDR to the left of the OTDR in which detector 15 is located to that OTDR. Output 31a is also connected to a circuit 32 whose output is connected to processing unit 41. Processing unit 41 determines if a pulse of light has not been received at the OTDR in which the detector 15 is located from the OTDR to the left.

The change in state in the output 31a caused by the detection by detector 15 of the pulse of light from the OTDR to the left initiates the counting of the counter 33. The output of counter 33 is connected to the input of circuit 35 which provides a signal to indicate that the laser of the OTDR should be pulsed. The output of circuit 33 is also connected to the input of circuit 37 which provides a signal to reset flip-flop 31 and to the input of a counter 39 which counts the time $T+t_x$. The output of counter 39 is connected to processing unit 41.

As described above, the receipt of the pulse of light from the OTDR located to the left of the one in which detector 15 is located triggers flip-flop 31 which causes a change in state of output 31a. That change in state starts counter 33 which counts the time $T-t_x$. The OTDR to the left has generated its pulse of light at time nT where n is either odd or even depending on the location of that OTDR in the arrangement of tandem OTDRs. The pulse of light has taken the time $t_x$ to travel from the OTDR to the left to the one in which detector 15 is located. When counter 33 finishes counting the time $T-t_x$ the actual time is T later than the time nT at which the OTDR to the left generated the detected pulse of light.

As can be seen from FIGS. 3a, 3b and 3c if the OTDR to the left is OTDR 10a and the OTDR in which detector 15a is located is OTDR 10b then when counter 33 finishes its count it is time for OTDR 10b to generate its pulse of light. Circuit 35 provides the signal which indicates to the laser 11b of OTDR 10b that a pulse of light should be generated. At that same time counter 33 should be reset to await the receipt, at a time which is $T+t_x$ after the time counter 33 has completed its counting, of the next pulse of light from the OTDR to the left. As can be seen from FIGS. 3a, 3b and 3c, OTDR 10b receives the next pulse of light from OTDR 10a at that later actual time. Circuit 37 provides the reset signal to counter 33. Since the next pulse of light from the laser of the OTDR to the left should be received at a time $T+t_x$ after the time at which counter 33 finishes counting time $T-t_x$, counter 39 starts counting the time $T+t_x$ directly after counter 33 finishes its counting.

When counter 39 finishes counting the time $T+t_x$ it provides a signal to processing unit 41. At that actual time the OTDR in which detector 15 is located expects to receive a pulse of light from the OTDR to the left. The signal provided by counter 39 to the processing unit is an indication to the software of the processing unit that the OTDR should be receiving a pulse of light from the OTDR to the left. Circuit 32 provides a signal to the processing unit that the pulse has been received. The processing unit is programmed to determine if the pulse from the laser of the OTDR to the left is received within a predetermined interval of time. If it is not, the processing unit provides a signal which is used by the OTDR to give an alarm. The failure to receive the pulse within the predetermined time is an indication of a fault in the arrangement of tandem OTDRs, for example a break in the fiber connecting the OTDR in which detector 15 is located with the OTDR to the left.

That same signal is also used by the control system of the OTDR to pulse the laser of the OTDR. The pulse of light travels from right to left on the fiber which connects the OTDR to the OTDR immediately to its left. If the fault is on that fiber the OTDR can use the light backscattered from that pulse of light to determine the location of a fault on that fiber. It should be appreciated that the OTDR immediately to the left is also generating pulses of light which travel from left to right on that same fiber. The light backscattered from the fiber by those pulses can also be used to determine the location of a fault on that fiber.

When N OTDRs are connected in a shared tandem arrangement as shown in FIG. 2, it is first necessary to determine the length of each of the fibers connecting adjacent OTDRs in the arrangement. That can be accomplished by starting with the OTDR at one end of the arrangement and having it transmit a pulse of light on its associated fiber. The backscattered light can be used to determine the length of that fiber. The next adjacent OTDR then transmits a pulse of light on its associated fiber in the same direction as the pulse of light transmitted by the first OTDR.

For example, if the first OTDR is the one at the left end of the arrangement, i.e. the master OTDR is at the left end of the arrangement it transmits a pulse of light which travels from left to right on its associated fiber. Each of the other OTDRs in the arrangement (with the exception of the OTDR at the right end of the arrangement) then transmits a pulse on the fiber which connects it to the OTDR which is to its immediate right. In this manner the length of each of the fibers in the arrangement is determined.

Having determined the length of each of the fibers in the arrangement the time 2T can be selected to be twice the time for the longest length plus a safety margin in the form of a small amount of time. The safety margin takes into account the possibility of drift and with the safety margin the processing unit 41 does not provide an alarm when drift occurs. The times T and $t_x$ can then be set in the counters 33 and 39 of each of the OTDRs in the arrangement. Appropriate entries can be made in the software of processing unit 41. The arrangement is then activated by having the master OTDR generate its first pulse of light. Thereafter as shown in FIGS. 3a to 3f each of the other OTDRs in the arrangement will generate their pulses of light at the appropriate times.

Figure 5:
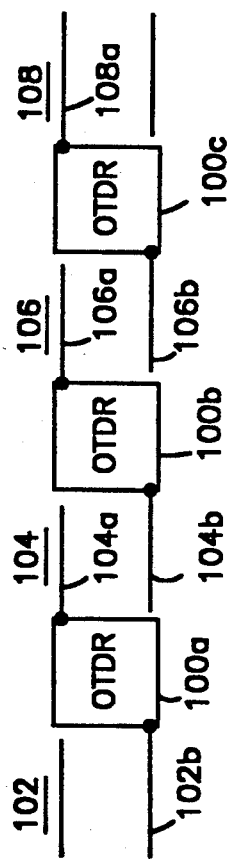
FIG. 5 shows a simplified diagram wherein a number of OTDRs each share two dark fibers in an associated one of a number of cables.

Referring now to FIG. 5 there is shown another arrangement of OTDRs in accordance with the principles of my invention. In this arrangement each of the optical fiber cables has two dark fibers per cable. Dark fibers are those fibers in each cable on which light is not ordinarily transmitted. Several of the fibers in a cable are usually set aside to be dark fibers much in the same manner as a number of wire pairs in a copper telephone cable are set aside as spare pairs.

Each of the OTDRs 100a, 100b and 100c in this arrangement are associated with one of the two dark fibers in each of cables 102, 104, 106 and 108. OTDR 100a is associated with dark fiber 102b of cable 102 and dark fiber 104a of cable 104. OTDR 100b is associated with dark fiber 104b of cable 104 and dark fiber 106a of cable 106. OTDR 100c is associated with dark fiber 106b of cable 106 and dark fiber 108a of cable 108.

Since each of the OTDRs is transmitting a pulse of light on a dark fiber which is associated only with that OTDR there isn't any need to synchronize the generation of light pulses by the OTDRs. Therefore the OTDRs in the arrangement of FIG. 5 are not connected in tandem as are the OTDRs of the arrangement shown in FIG. 2. They each share a pair of fibers in the manner described for FIG. 1. Thus each of the OTDRs 100a, 100b and 100c are identical to the OTDR 10 of FIG. 1.

Figure 6:
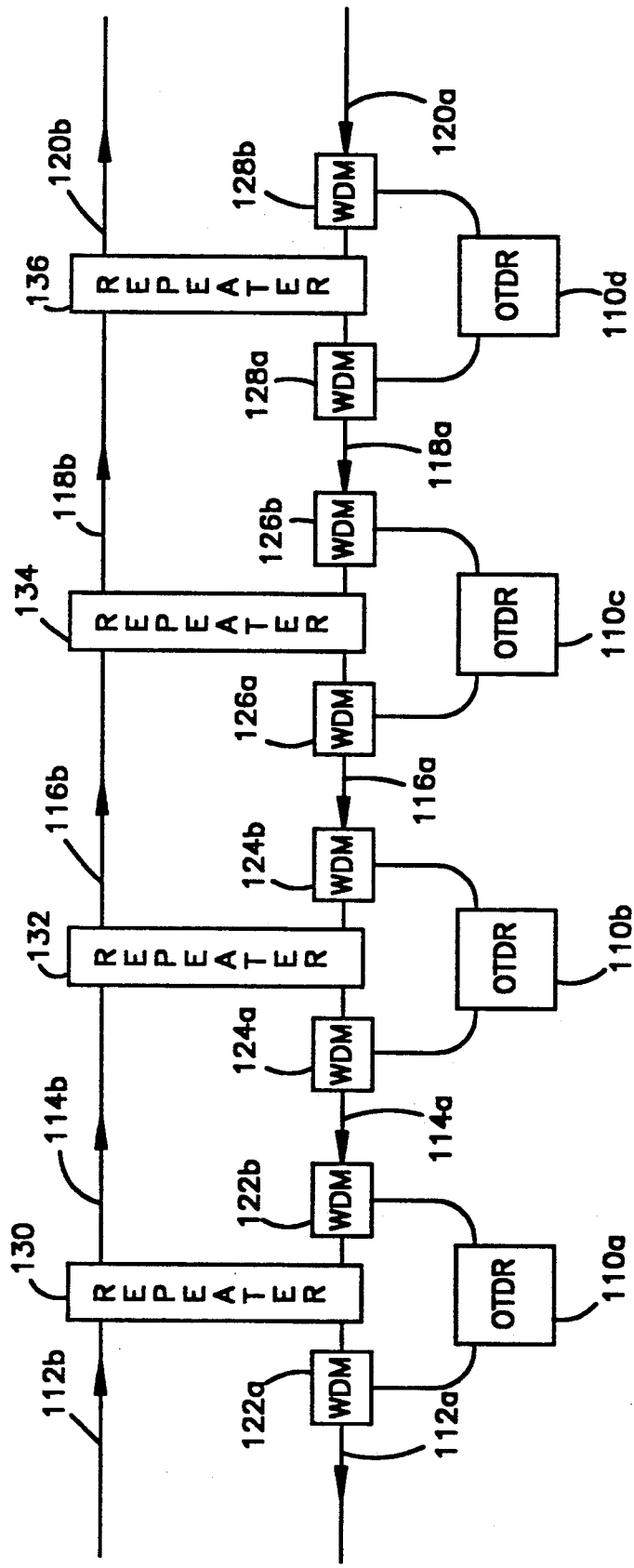
FIG. 6 shows a simplified diagram wherein a number of OTDRs are connected in tandem to live fibers.

Referring now to FIG. 6 there is shown a further arrangement of OTDRs in accordance with the principles of my invention. In this arrangement OTDRs 110a, 110b, 110c and 110d are connected to an associated one of live fibers 112a, 114a, 116a, 118a and 120a by an associated one of the pairs of wave division multiplexers (WDMs) 122a, 122b; 124a, 124b; 126a, 126b; and 128a, 128b. Light is transmitted in one direction (right to left) on fibers 112a to 120a while light is transmitted in the opposite direction (left to right) on fibers 112b to 120b. Live fibers are those on which light is ordinarily transmitted. The arrangement of FIG. 6 also includes repeaters 130, 132, 134 and 136.

Since fibers 112a to 120a are live fibers they ordinarily carry light having a known wavelength. The pulses of light generated by OTDRs 110a to 110d should not interfere with the light ordinarily carried by the fibers. Therefore those pulses must be at a wavelength which is different from the wavelength of the light ordinarily carried on the fibers. The wavelength of those pulses must also be one which can be transmitted on the fibers without substantial attenuation. The pulses of light provided by the OTDRs are wave division multiplexed with the light ordinarily transmitted on the fibers 112a to 120a. Such multiplexing is provided by WDM pairs 122a, 122b to 128a, 128b.

As is shown in FIG. 6, OTDR 110a sends a pulse of light to the right on fiber 114a while OTDR 110b sends pulse of light to the left on the same fiber. In a similar manner OTDRs 110b and 110c transmit pulses of light in opposite directions on fiber 116a and OTDRs 110c and 110d transmit pulses of light in opposite directions on fiber 118a. Therefore in the arrangement of FIG. 6, OTDRs 110a to 110d are connected in tandem in the manner of the OTDRs of the arrangement shown in FIG. 2. Thus each of OTDRs 110a to 110d must be embodied as described for FIGS. 2 and 4 and their generation of light pulses must be synchronized with each other as described for FIG. 3.

Referring now to FIG. 7 there is shown a further arrangement of OTDRs in accordance with the principles of my invention. In this arrangement each of OTDRs 150a to 150d are connected by the associated one of WDM pairs 152a, 152b to 158a, 158b to the associated one of pairs of live fibers 112b, 114a to 118b, 120a. Since in this arrangement each of the OTDRs are each associated with a pair of fibers which are different from the pair of fibers associated with an adjacent OTDR it should be clear that OTDRs 150a to 150d are not connected in tandem in the manner of the OTDRs of the arrangements of FIGS. 2 and 6. They each share a pair of fibers in the same manner as the OTDRs of FIGS. 1 and 5.

Each of the repeaters 130 to 136 include a laser. Each of the OTDRs provides a pulse of light which travels towards the laser of the next adjacent repeater. This pulse of light may then affect performance of the system which includes the arrangement of FIG. 7. Therefore in order to avoid a degradation in system performance the arrangement must include means for mitigating the affect of the OTDR light pulse on the laser of the repeater. This mitigating means can be provided in the form of additional WDMs such as the two WDMs 162, 164 connected to fiber 114a, 114b. The mitigating means can also be provided by using better lasers or isolation.

Referring now to FIG. 8a there is shown a simplified diagram of a counter-rotating fiber-optic communication ring 160 in which in accordance with the principles of my invention a single shared OTDR can be used to monitor the fibers of the ring. That connection of the single shared OTDR is shown in FIG. 8b. The light backscattered on the fibers of the ring from the pulses of light from the shared OTDR propagating on the fibers is shown in FIGS. 8c and 8d.

The ring 160 of FIG. 8a may be used in local area networks (LANs) to provide data transmission between a multiplicity of stations. The use for LANs is specified by an industry standard known as the "Fiber Distributed Data Interface" (FDDI). Ring 160 is also being considered for use in the evolving Synchronous Optical Network (SONET) standard. As will be described in more detail below, ring 160 ensures that all of the stations are still able to transmit information to each other even if the fiber bundle connecting any two of the stations is broken. This ensures survivability of the data transmission between stations. Such survivability is important as in the LAN FDDI application the stations are transmitting information to each other at rates in excess of 100 megabits per second.

As shown in FIG. 8a, ring 160 includes five hereinafter as stations one to five respectively. Each station has two receivers each designated by R and two transmitters each designated by T. Also as shown in FIG. 8a, the stations are interconnected to each other by an associated one of five fiber bundles 164, 166, 168, 170 and 172, each of which has a first fiber for carrying information in the clockwise direction around the ring and a second fiber for carrying information in a counterclockwise direction around the ring. Since these fibers carry information they are live fibers.

For example, fiber bundle 164 interconnects station one to station two and fiber 164a of the bundle carries information in the clockwise direction between the two stations while fiber 164b carries information in the counterclockwise direction between the two stations. The stations interconnected by the other fiber bundles 166 to 172 and the fibers of those bundles which carry information in either direction around the ring should be self evident from FIG. 8a.

Ring 160 ensures that information from one of the stations to another of the stations and vice versa will still reach the destination station even if one of the fibers bundles breaks. For example, suppose bundle 164 has broken. The direct connection of a transmitter of station one to a receiver of station two by fiber 164a and the direct connection of a transmitter of station two to a receiver of station one by fiber 164b both no longer exist. Stations one and two can, however, still transmit information to each other. The fiber path for that flow of information is provided by bundles 166 to 172. The information from station one to station two and vice versa must now pass through stations three, four and five.

Referring now to FIG. 8 there is shown in accordance with the principles of my invention the connection of a single shared OTDR 180 to ring 160 for the purposes of monitoring the fibers of the ring. OTDR 180, having a source of light 180a which may be a laser or a light emitting diode (LED) and first and second detectors 180b and 180c, is connected to the fibers of the ring at station one. The single light pulse from the source 180a is split as described for FIG. 1a into two pulses having essentially the same power. For ease of illustration the splitter shown in FIG. 1 has been omitted from FIG. 8b.

One of the two pulses of light is input to fiber 172b and propagates in a counterclockwise direction around the ring. The other of the two pulses is input to fiber 164b and propagates in a clockwise direction around the ring. Detector 180b detects the light backscattered from the pulse propagating in the counterclockwise direction while detector 180c detects the light backscattered from the pulse propagating in the clockwise direction.

Since the fibers of the ring are live fibers, the OTDR pulses of light cannot interfere with the light propagating on the fibers which is used to transmit information between the stations of the ring. If the information carrying light on the fibers has a first wavelength designated as λ1 in FIG. 8b then the OTDR pulses of light must have a second and different wavelength designated as λ2 in FIG. 8b. As was described for FIG. 6, it is then necessary to use WDMs when the OTDR pulses of light are input to fibers 164b and 172b. The OTDR pulse of light that propagates in the counterclockwise direction is input to fiber 172b by WDM 174a and the OTDR pulse of light that propagates in the clockwise direction is input to fiber 164b by WDM 174b. These WDMs also serve to output the backscattered light from the fibers to the associated one of detectors 180b and 180c.

The counterclockwise and clockwise propagating pulses of light from OTDR 180 should not interfere with the receiving at stations two to five of the information carrying light on the fibers. To that end there is a bypass path 176, 178, 182 and 184 associated with each of stations two to five respectively for the OTDR pulses of light. Each bypass path consists of two WDMs and a length of optical fiber. One of the WDMs is used to remove the OTDR pulse from the fiber on which it is propagating just before it reaches the station and the other WDM is used to input the OTDR pulse back onto the ring fibers in the direction it was propagating just after the station.

For example, there is associated with station two the bypass path 176 having first and second WDMs 176a and 176c and a length of optical fiber 176b just sufficient to provide a bypass path around the station between the WDMs. When the clockwise propagating OTDR pulse on fiber 164b reaches WDM 176a it is removed from the fiber and input to one end of bypass fiber 176b. The other end of fiber 176b is connected to WDM 176c which is used to input the clockwise propagating OTDR pulse in the clockwise direction to fiber 166b.

It should be appreciated that bypass paths 176, 178, 182 and 184 also allow the light backscattered on the ring fibers from the counterclockwise and clockwise OTDR pulses propagating thereon to bypass stations two to five. While the bypass paths and in particular the bypass fibers are each shown in FIG. 8b as having a length which appear to be almost the same as the fibers of the ring, that is simply a result of the need to clearly show the WDMs and bypass fiber of each bypass path. For example, when the ring is used in an FDDI LAN the stations are at least 500 m from each other. The length of the bypass fiber at each station is only that necessary to provide the path for the OTDR pulses around the station.

Referring now to FIGS. 8c and 8d there are shown the waveforms of the backscattered light received at detectors 180b and 180c, respectively. Detector 180b receives the light backscattered from the OTDR pulse of light which is propagating in the counterclockwise direction on the ring fibers. Detector 180c receives the light backscattered from the OTDR pulse of light which is propagating in the clockwise direction on the ring fibers.

The total time for receiving at detector 180b (180c) all of the backscattered light from the counterclockwise (clockwise) propagating OTDR pulse is $T_2$. That time $T_2$ is twice the time $T_1$ that it takes for a pulse of light to propagate once around the ring. As can be seen from FIG. 8c (8d), detector 180b (180c) receives at time $T_1$ a pulse of light which is the OTDR light pulse that has been propagating on the ring fibers in the clockwise (counterclockwise) direction. The receipt of that pulse causes the OTDR to be unable to monitor a small portion of the fiber for which it is receiving backscattered light at the time $T_1$. That small portion of unmonitorable fiber is sometimes referred to as a "dead zone".

The existence of that dead zone does not unduly impair the monitoring of the fibers by OTDR 180. In accordance with the principles of my invention of one OTDR sharing what is in effect in this instance two fibers, the power of the OTDR light pulse source is lower than it would have to be if the OTDR were monitoring a single fiber. At the time $T_1$ the OTDR has monitored halfway around the ring in each direction In other words at the time $T_1$ the OTDR has monitored the entire ring and therefore the receipt by the OTDR's detectors of the light pulses propagating in the opposite directions on the ring does not unduly impair the monitoring of the ring. In addition, as is shown in FIGS. 8c and 8d the backscattered light is very close to the noise level at time $T_1$ as the power of the clockwise and counterclockwise propagating pulses when they leave the OTDR is low.

In describing all but one of the various embodiments of the present invention, the source of light has been referred to as a laser or laser diode. It should be appreciated that as my invention allows the light pulse from the source to be lower in power than it would have to be if the pulse was not split, the source of light need not be a laser or laser diode. The source of light may, depending on where it is to be used, be a LED.

It is to be understood that the description of the preferred embodiments is intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. An instrument for sharing N (N≧2) optical fibers comprising:
   a) a single means for generating a pulse of light:
   b) means for splitting said pulse of light into N pulses of light each having essentially the same power and each associated with one of said N optical fibers; and
   c) means responsive to light from each of said N optical fibers for monitoring each of said N optical fibers independently of any other of said N optical fibers when each of said N light pulses are input to said associated one of said N fibers.

2. The instrument of claim 1 wherein said monitoring means is responsive to backscattered light from each of said N optical fibers.

3. The instrument of claim 1 wherein said monitoring means includes N monitoring means each associated with one of said N optical fibers.

4. The instrument of claim 3 wherein each of said N light detecting means detects light backscattered from said associated one of said N optical fibers.

5. The instrument of claim 1 wherein said monitoring means generates an electrical signal for the light from each of said N fibers.

6. The instrument of claim 5 wherein said monitoring means is responsive to backscattered light from each of said N optical fibers.

7. The instrument of claim 6 wherein said monitoring means includes means individually responsive to each of said N electrical signals for monitoring said associate done of said N optical fibers.

8. The instrument of claim 7 wherein said monitoring means further includes an N:1 multiplexer for multiplexing said N electrical signals.

9. The instrument of claim 1 further comprising means for connecting each of said N light pulses to an associated one of said N fibers.

10. The instrument of claim 9 wherein each of said N fibers are live fibers for propagating light having a first predetermined wavelength and said connecting means includes means for wave division multiplexing each of said N light pulses with said first predetermined wavelength propagating light, each of said N light pulses having a second predetermined wavelength which is different than said first predetermined wavelength.

11. A system comprising:
   a) a first instrument for sharing first and second optical fibers comprising:
      i) a signal means for generating a pulse of light;

ii) means for splitting said pulse of light into two pulses of light each having essentially the same power and each associated with one of said first and second optical fibers; and iii) means responsive to light from at least said second optical fiber for monitoring at least said second optical fiber independently of said first optical fiber when said associated one of said two light pulses is input to said second optical fiber.

12. The system of claim 11 wherein said first instrument further comprises means for connecting said associated one of said two light pulses to said second fiber.

13. The system of claim 12 wherein said second fiber is a live fiber for propagating light having a first predetermined wavelength and said first instrument connecting means includes means for wave division multiplexing said associated one of said two light pulses with said second fiber first predetermined wavelength propagating light, said single means pulse of light having a second predetermined wavelength which is different than said first predetermined wavelength.

14. The system of claim 11 wherein said first instrument monitoring means is also responsive to light from said first fiber for monitoring at least said first optical fiber independently of said second optical fiber when said associated one of said two light pulses is input to said first optical fiber.

15. The system of claim 14 wherein said first instrument monitoring means includes two light detecting means each associated with one of said first and second fibers.

16. The instrument of claim 15 wherein each of said two light detecting means detects light backscattered from said associated one of said first and second fibers.

17. The system of claim 11 wherein said first instrument monitoring means is responsive to backscattered light from said second optical fiber and said first instrument further comprises:

iv) means for controlling said single means to generate said pulse of light at times nT where n=0, 2, 4, etc.;

said system further comprising:

b) a second instrument for sharing said second optical fiber and a third optical fiber comprising:
  i) a single means for generating a pulse of light;
  ii) means for splitting said pulse of light into two pulses of light each having essentially the same power and each associated with one of said second and third optical fibers;
  iii) means responsive to light from at least said second optical fiber for monitoring at least said second optical fiber independently of said third optical fiber when said associated one of said second instrument two light pulses is input to said second fiber, said second instrument pulse of light associated with said second fiber input to an end of said second fiber opposite the end of said second fiber to which said first instrument pulse of light associated with said second fiber is input; and
  iv) means for controlling said single means to generate said pulse of light at times nT where n=1, 3, 5 etc. ; and T is selected to be more than the time it takes for a pulse of light to propagate on said second fiber from one of said first and second instruments to the other of said first and second instruments.

18. The system of claim 11 wherein said first instrument monitoring means is responsive to backscattered light from said second optical fiber and said first instrument further comprises:

iv) means for controlling said single means to generate said pulse of light at times spaced apart from each other by a predetermined time interval;

said system further comprising:

b) a second instrument for sharing said second optical fiber and a third optical fiber comprising:
  i) a single means for generating a pulse of light;
  ii) means for splitting said pulse of light into two pulses of light each having essentially the same power and each associated with one of said second and third optical fibers;
  iii) means responsive to light from at least said second optical fiber for monitoring at least said second optical fiber independently of said third optical fiber when said associated one of said second instrument two light pulses is input to said second fiber, said second instrument pulse of light associated with said second fiber input to an end of said second fiber opposite the end of said second fiber to which said first instrument pulse of light associated with said second fiber is input; and
  iv) means for controlling said single means to generate said pulse of light at times which are spaced apart from said first instrument single means pulse of light generating times by half of said predetermined time interval and are spaced apart from each other said predetermined time interval.

19. The system of claim 18 wherein said first instrument further comprises means for connecting said associated one of said two light pulses to said second fiber and said second instrument further comprises means for connecting said associated one of said second instrument two light pulses to said second fiber.

20. The system to claim 19 wherein said second fiber is a live fiber for propagating light having a first predetermined wavelength and said first instrument connecting means includes means for wave division multiplex in said associated one of said two light pulses with said second fiber first predetermined wavelength propagating light, said first instrument single means pulse of light having a second predetermined wavelength which is different than said first predetermined wavelength and said second instrument connecting means includes means for wave division multiplexing said associated one of said second instrument two light pulses with said second fiber first predetermined wavelength propagating light, said second instrument single means pulse of light having a third predetermined wavelength which is different than said first predetermined wavelength.

21. The system of claim 18 wherein said first instrument monitoring is responsive to backscattered light from said first optical fiber when said associated one of said first instrument two light pulses is input to said first fiber and said second instrument monitoring is responsive to backscattered light from said third optical fiber when said associated one of said second instrument two light pulses is input to said third fiber.

22. The system of claim 21 wherein said first instrument monitoring means comprises first and second light detecting means associated with said first and second fibers, respectively, and said second instrument monitoring means comprises first and second light detecting means associated with said second and third fibers, respectively.

23. The system of claim 18 wherein said first instrument monitoring means generates an electrical signal for the backscattered light from each of said first and second fibers and said second instrument monitoring means generates an electrical signal for the backscattered light from each of said second and third fibers.

24. The system of claim 23 wherein said first instrument monitoring means includes means individually responsive to said first and second fibers backscattered light electrical signals for monitoring said associated one of said first and second fibers and said second instrument monitoring means includes means individually responsive to said second and third fibers backscattered light electrical signals for monitoring said associated one of said second and third fibers.

25. The system of claim 24 wherein said first instrument monitoring means further includes a 2:1 multiplexer for multiplexing said first and second fibers backscattered light detected electrical signals and said second instrument monitoring means further includes a 2:1 multiplexer for multiplexing said second and third fibers backscattered light detected electrical signals.

26. A system comprising:
   a) N instruments where $N>2$, one of said N instruments located at one end of said system and another of said N instruments located at the other end of said system, each of said N instruments other than said one system end located instrument and said other system end located instrument located between said one system end and said other system end;
   b) $N-1$ optical fibers, one of said $N-1$ fibers connected to said instrument located at said one system end and the one of said N instruments next adjacent said one system end located instrument in a direction towards said other system end and another one of said $N-1$ fibers connected to said instrument located at said other system end and the one of said N instruments next adjacent said other system end located instrument in a direction towards said one system end, each of said $N-1$ fibers other than said one fiber connected to said one system end located instrument and said another fiber connected to said other system end located instrument connected between one of said other than N instruments and that one of said other than N instruments next adjacent;

each of N instruments comprising:
   i) a single means for generating a pulse of light;
   ii) means for splitting said pulse of light into two pulses of light each having essentially the same power and each associated with one of those two of said $N-1$ optical fibers connected to said instrument;
   iii) means responsive to light backscattered from each of said associated one of those two of said $N-1$ optical fibers for monitoring each of said associated one of those two of said $N-1$ optical fibers independently of each other when said two pulses of light are input to said associated one of those two of said $N-1$ optical fibers; and
   iv) means for causing said single means to generate said pulse of light at times separated by a time 2T where T is selected to be longer than the time it takes for a pulse of light to propagate from one end to the other end of the longest one of said $N-1$ fibers and in a manner such that a pulse of light from any one of said N instruments propagating in one direction one said associated one of those two of said $N-1$ fibers does not interfere with a pulse of light from an adjacent one of said N instruments propagating in the opposite direction on said associated one of those two of said $N-1$ fibers.

27. The system of claim 26 wherein each of said other than N instruments monitoring means comprises two light detecting means each associated with said associated one of those two of said $N-1$ optical fibers.

28. The system of claim 26 wherein each of said N instruments monitoring means generates an electrical signal for the backscattered light from each of said associated one of those two of said $N-1$ optical fibers.

29. The system of claim 28 wherein each of said N instruments monitoring means including means individually responsive to each of said electrical signals for monitoring said associated one of those two of said $N-1$ optical fibers.

30. The system of claim 29 wherein each of said N instruments monitoring means further includes a 2:1 multiplexer for multiplexing said electrical signals.

31. The system of claim 26 wherein each of said N instruments further comprise means for connecting each of said two light pulses to said associated one of those two of said $N-1$ optical fibers.

32. The system of claim 31 wherein each of said $N-1$ fibers are live fibers for propagating light having a first predetermined wavelength and each of said N instruments connecting means includes means for wave division multiplexing each of said two light pulses with said first predetermined wavelength propagating light, each of said two light pulses having a second predetermined wavelength which is different than said first predetermined wavelength.

* * * * *